United States Patent [19]

Nagaishi et al.

[11] 4,297,894
[45] Nov. 3, 1981

[54] MASS FLOW SENSOR

[75] Inventors: Hatsuo Nagaishi, Yokosuka; Toru Kita, Yokohama, both of Japan

[73] Assignee: Nissan Motor Co., Ltd., Yokohama, Japan

[21] Appl. No.: 72,695

[22] Filed: Sep. 5, 1979

[30] Foreign Application Priority Data

Sep. 8, 1978 [JP] Japan .................. 53/110396

[51] Int. Cl.³ .............................. G01F 1/86
[52] U.S. Cl. ...................................... 73/861.03
[58] Field of Search ......... 73/194 VS, 194 M, 205 D, 73/233, 30, 861.02, 861.03, 861.22, 861.24

[56] References Cited

U.S. PATENT DOCUMENTS

| 1,577,170 | 3/1926 | Brown | 73/30 |
| 1,646,474 | 10/1927 | Brown | 73/30 |
| 3,096,434 | 7/1963 | King | 73/205 |
| 3,318,150 | 5/1967 | Rose | 73/233 |
| 3,729,995 | 5/1973 | Kovacs et al. | 73/194 |
| 3,776,033 | 0/0000 | Herzl | |
| 4,026,150 | 5/1977 | Schmidt | 73/194 |
| 4,048,854 | 9/1977 | Herzl | 73/194 |
| 4,116,060 | 9/1978 | Frederick | 73/194 |

Primary Examiner—Herbert Goldstein
Attorney, Agent, or Firm—Lowe, King, Price & Becker

[57] ABSTRACT

A mass flow sensor comprising a Karman flow detector in a fluid passage including a vortex generator and a vortex detector for detecting periods of generated vortices, and an air density detector including a reference pressure chamber enclosing a standard gas and a comparison pressure chamber into which a fluid in the passage is introduced and detecting means whose output varies proportionally to pressures and temperatures of the fluid introduced in the comparison pressure chamber, thereby compensating a volume flow obtained from the flow detector to obtain a mass flow dependent upon a density of the fluid with high accuracy.

7 Claims, 8 Drawing Figures (P: Pitch of Vortices)

P: Air Density (g/cm³)
V: Sensor Output (V)

Q: Quantity of Flow
f: Frequency
k: Constant

MASS FLOW SENSOR

BACKGROUND OF THE INVENTION

1. Field of the Invention:

The present invention relates to a mass flow sensor and more particularly to a mass flowmeter, for example, for use in determining an intake air flow for an internal combustion engine.

2. Description of the Prior Art:

In an electronically controlled fuel injection gasoline engine, a quantity of intake air flow into the engine is detected and a quantity of fuel to be injected is controlled with the aid of the detected intake air flow so as to obtain a desired air-fuel ratio.

The intake air varies much greatly in specific weight depending upon atmospheric pressure and temperature than the fuel, and, therefore, if the fuel is supplied to the engine only according to the measured volume flow of the intake air, an actual air-fuel ratio will deviate from a desired value to lower an output performance with undesirable exhaust gas composition.

In order to solve this problem, it has been suggested to correct the measured quantity of flow according to the atmospheric pressure and temperature to eliminate the errors of the quantity of flow. However, a provision of two compensation means make the device complicated and expensive.

An intake air flow sensor has been suggested which comprises an inclined plate for changing an area of a passage depending upon a quantity of the flow, whose inclined angles are measured by a potentiometer. Such a sensor may lack reliability and be inferior in accuracy because of many movable parts included in the sensor.

SUMMARY OF THE INVENTION

It is an object of the invention to provide a mass flow sensor which overcomes the above disadvantages in the prior art.

It is another object of the invention to provide a mass flow sensor comprising a Karman vortices type flow detector for digitally detecting volume flows of a fluid and an air density detector for compensating the output of the flow detector to measure a mass flow of the fluid with high accuracy.

The invention will be more fully understood by referring to the following detailed specification and claims taken in connection with the appended drawings.

DETAILED DESCRIPTION OF PREFERRED EMBODIMENT

Figure 1:
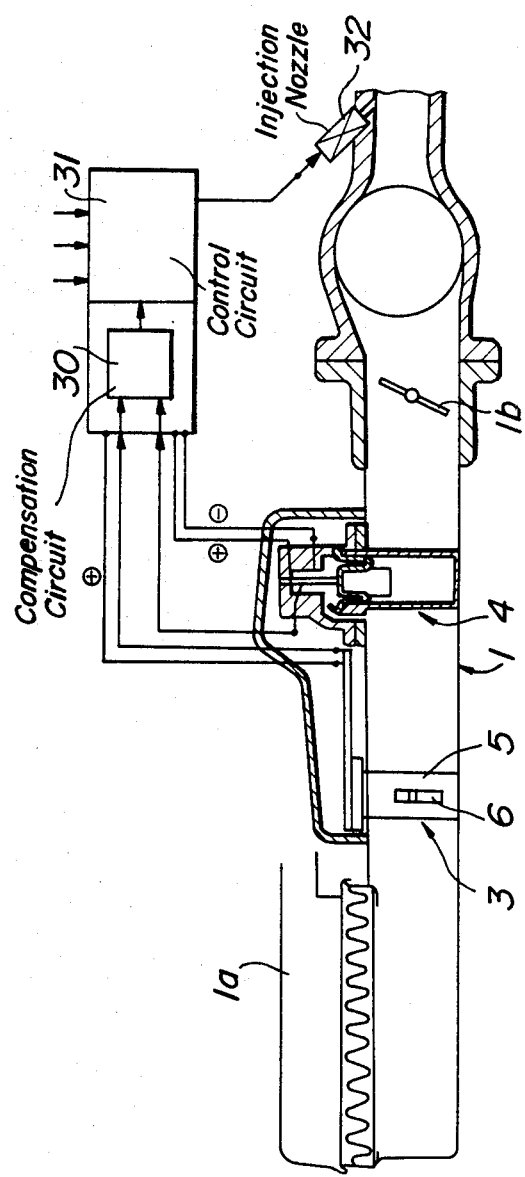
FIG. 1 is a sectional view of one embodiment of a mass flow sensor according to the invention.
Figure 2:
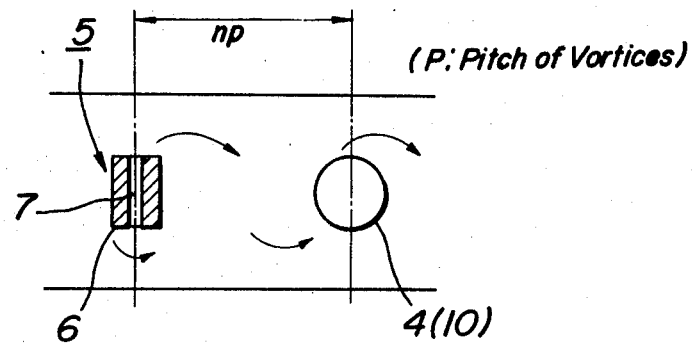
FIG. 2 is a diagrammatic view showing a relation in distance between the air flow detector and vortex generator of the sensor in FIG. 1.

Referring to FIGS. 1 and 2 illustrating one embodiment of the invention which is an application of the invention for measuring intake air flow for an internal combustion engine, a sensor according to the invention is arranged between an air cleaner 1a and a throttle valve 1b in an air intake passage 1 of the engine.

An air flow detector 3 of the sensor is arranged upstream and an air density detector 4 is arranged downstream of the passage 1. In this embodiment, the air flow detector 3 is a Karman vortices type volume flow sensor and includes a vortex generator 5 arranged substantially perpendicular to flow lines of the intake passage 1.

The vortex generator 5 includes a communicating aperture 6 opening at its sides generally at right angles to the flows, within which apertures is located a vortex detector 7 comprising a heating wire having a fine diameter adapted to be supplied with a constant electric current for detecting a vortex generating period.

The fluid alternately peels off or removes from the sides of the vortex generator 5 proportional to a velocity of the flow to cause regular rows of vortices (Karman vortices rows) downstream of the passage and periodic pressure differences at the opened sides of the communicating aperture 6 due to pressure drops on the peeling of the fluid. The pressure differences in turn cause alternate fluid flows in the communicating aperture 6, which cools the heating wire to vary its resistance value resulting in periodic change of voltage value.

Figure 3:
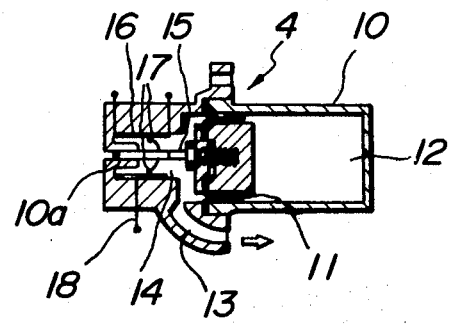
FIG. 3 is a sectional view of the air flow detector in FIG. 1.

Therefore, a frequency of change in voltage is detected to obtain a period of occurrence of Karman vortices rows, from which a velocity of the flow is obtained, and from which a quantity of the flow (volume flow) is measured in connection with a crosssectional area of the passage. Thus obtained volume flow is compensated with a density of the air to obtain a mass flow of the fluid flow. For this purpose, as shown in FIG. 3, the air density detector 4 comprises a cylindrical housing 10 with a diaphragm 11 extending thereacross to define a reference pressure chamber 12 enclosing a standard gas and a comparison pressure chamber 14 into which is introduced the air in the intake passage 1 through a communicating passage 13.

To the diaphragm 11 is connected a rod 15 which is supported in a bearing 10a of the housing 10 and slidably moved by the displacement of the diaphragm 11. The rod 15 is provided with movable contacts 17 adapted to be in slidable contact with resistors 16 which are in parallel with the rod 15 and secured to parts of the housing 10 through insulators, so that the contacts 17 always slidably but electrically contact an output terminal 18 to form a position detector. With this arrangement, a determined voltage is applied across ends of the resistors 16 to obtain at the output terminal 18 an output voltage proportional to the displacement of the movable contacts 17.

Figure 5:
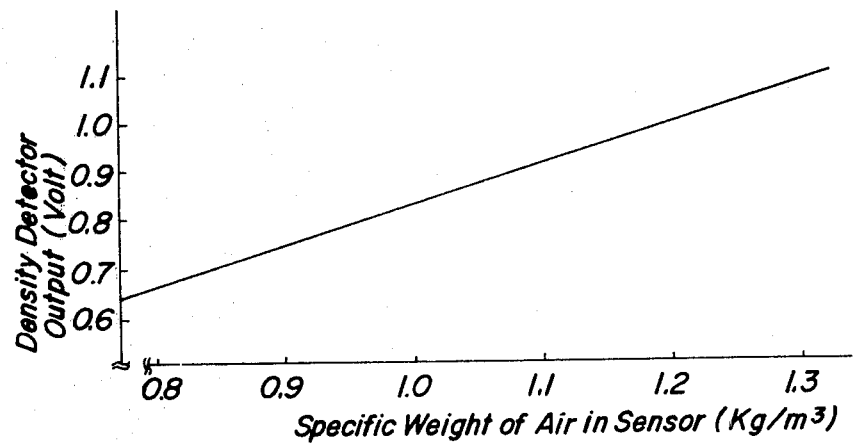
FIG. 5 is an explanatory diagram illustrating the output characteristic of the density detector of the sensor according to the invention.

The standard gas enclosed in the reference pressure chamber 12 causes the diaphragm 11 to displace according to a relation to pressures (atmospheric pressures) and temperatures of the air introduced in the comparison pressure chamber 14 thereby to change the output voltage characteristic of the output terminal 18 correspondingly to a specific weight of the air as shown in FIG. 5.

Figure 4:
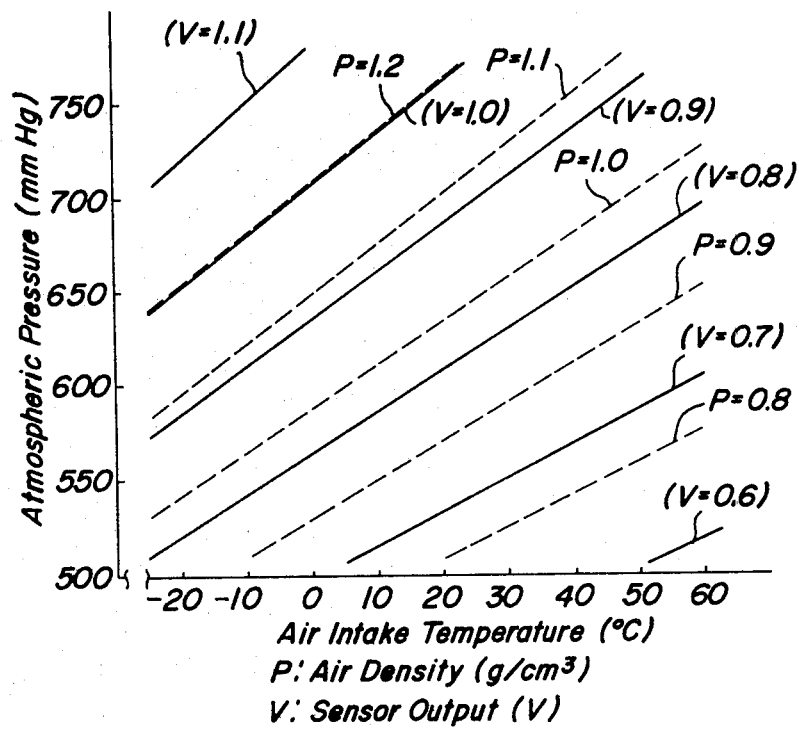
FIG. 4 is an explanatory diagram illustrating the relation between air density and the atmospheric pressure and temperature.

FIG. 4 illustrates densities of the air dependent upon relations between the atmospheric pressures and temperatures.

The diaphragm 11 moves inwardly toward the reference pressure chamber 12 when the atmospheric pressure rises and moves toward the comparison pressure chamber 14 when the atmospheric temperature rises in a proportional manner, thereby changing the output voltage of the sensor as above described.

Figure 6:
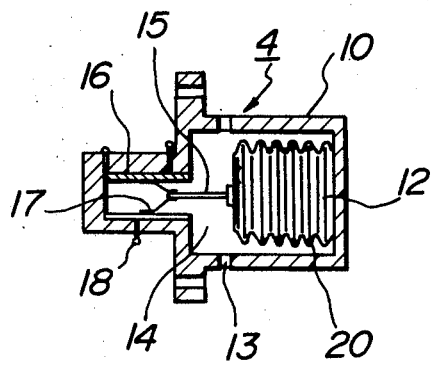
FIG. 6 is a sectional view of another embodiment of the density detector of the sensor according to the invention.

Referring to FIG. 6 illustrating another embodiment of the air density detector 4, a bellows 20 enclosing a standard gas therein is used as a pressure responsive member instead of the diaphragm 11.

In the embodiment shown in FIG. 3, there is an advantage in that the diaphragm 11 operates to equalize the pressure of the enclosed standard gas substantially to the atmospheric pressure, thereby obtaining a linear characteristic of the density detector with relatively narrow or concentrated dispersion of measured values. In contrast herewith, the embodiment shown in FIG. 5 employs the bellows 20 having a small spring constant to obtain the density detector having little hysteresis characteristic and insusceptible to vibrations.

The output of the flow detector 3 is compensated in a compensation circuit 30 referring to an output of the density detector 4 constructed above described to obtain a correct mass flow of the fluid dependent upon the atmospheric pressure and temperature at that time.

As the output of the flow detector 3 is digital (or of a pulse signal), it is converted into an analog signal by means of a digital-to-analog converter and directly added with an output of the density detector 4 to obtain a mass flow value instantaneously.

With this embodiment, the flow signal is inputted into a control circuit 31 for controlling the engine fuel supply, so that an optimum fuel flow is determined with other signals simultaneously inputted into the control circuit representing the operating parameters of the engine such as engine revolutions, suction negative pressures, engine cooling water temperatures or the like. The control pulse signal representing the optimum fuel flow causes to operate a fuel injection valve 32 provided in the intake passage 1.

Figure 7:
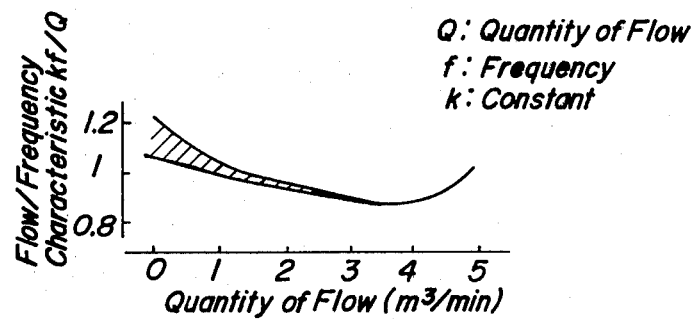
FIG. 7 is an explanatory diagram showing a general flow/frequency characteristic at a flow detector.

The rate of the frequencies of occurrences of vortices to the air flows at the detector 3 somewhat disperses within a range because of errors due to variations in pitch of vortices dependent upon air flows as shown in FIG. 7. It is understood that such variations result from the changes in status of flow in the passage dependent upon the quantity of flow or velocity of flow (a disturbance in flow causes a change in occurrence of vortices), and the deviations of linear or direct proportional characteristic due to variations in Reynolds number.

In order to prevent the variation in characteristic of the detector, the distance between the vortex generator 5 and the housing 10 of the density detector 4 is determined so as to be integral number times the pitch of vortices typically determined by an effective width of the vortex generator 5 thereby preventing the variation in characteristic of the detector with the aid of the synchronism of the pitch of vortices with the above distance and further enhancing the occurrence of the vortices.

The configuration of the vortex generator may be cylindrical or rectangular in crosssection, whose width interrupting the flow in the passage is referred to as "effective" width therein.

The Karman vortices occur proportional to velocities of a fluid flow. As the velocity of the fluid flow becomes higher, frequencies of the occurrence of the vortices become higher. The pitch of the vortices is determined only by the effective width or diameter of the vortex generator but has nothing to do with the velocity of the fluid.

Figure 8:
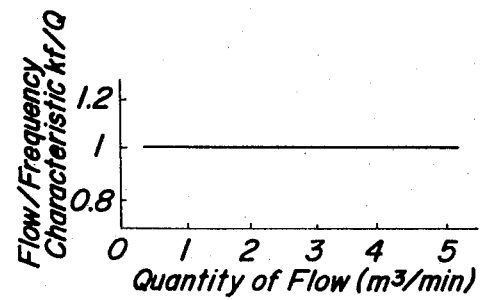
FIG. 8 is an explanatory diagram illustrating the improved flow/frequency characteristic according to the invention.

Accordingly, the housing 10 is made to have the same diameter as that of the vortex generator 5 correspondingly to the pitch of the vortices, whereby the vortices occur in synchronism with the above distance such that the vortices on the downstream side affect those on the upstream side to promote stable occurrences of the vortices. With this arrangement, the stable occurrences of the vortices are obtained whose flow/frequency characteristic is linear in all velocities of flow as shown in FIG. 8.

In case of arranging the housing 10 of the air density detector 4 at the same distance as that above described upstream of the vortex generator 5, the same effect can also be obtained.

As can be seen from the above description, the sensor according to the invention can convert volume flows into mass flows with high accuracies and is simple in construction whose characteristic is stable for a long period of time because of less movable parts.

According to the invention, moreover, the air density detector is arranged to enhance the occurrence of vortices so that even if there is any disturbance in flow, the stable linear proportional characteristic can be maintained over wide quantity range of the flow, which makes it possible to measure the quantity of flow with higher accuracies.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A mass flow sensor comprising a Karman flow detector arranged in a fluid flow path, said flow detector including a vortex generator and a vortex detector generating a detector signal in response to detected periods of generated vortices, and an air density detector including temperature and pressure responsive means for generating a signal proportional to pressures and temperatures of said fluid, said temperature and pressure responsive means comprising an elastic member defining a reference pressure chamber enclosing a standard gas and a comparison pressure chamber into which is introduced said fluid in said fluid flow path, and a rod connected to said elastic member and movable in response to movements of said elastic member, means responsive to a position of said rod to produce an output voltage proportional to said movement of said elastic member, and means responsive to said output voltage for compensating said vortex detector signal to obtain a fluid density dependent mass flow signal, wherein said fluid density detector and said flow detector have a common width and are aligned with each other on a common longitudinal axis in said fluid flow path, said detector being spaced apart from each other by a distance that is an integral multiple of a distance between successive Karman vortices.

2. A mass flow sensor as set forth in claim 1, wherein said temperature and pressure responsive means comprises a diaphragm.

3. A mass flow sensor as set forth in claim 1, wherein said temperature and pressure responsive means comprises a bellows.

4. A mass flow sensor as set forth in claim 1, wherein said output voltage producing means includes electrical contact means on said rod and stationary output contact means, said rod contact means being in sliding contact with said stationary contact means.

5. A mass flow sensor as set forth in claim 4, wherein said stationary contact means includes a resistor.

6. A mass flow sensor as set forth in claim 1, wherein said density detector is arranged upstream of the vortex generator in the fluid flow path.

7. A mass flow sensor as set forth in claim 1, wherein said density detector is arranged downstream of the vortex generator in the fluid flow-path.

* * * * *